3,035,032
PROCESS FOR THE POLYMERIZATION OF ETHYLENICALLY UNSATURATED COMPOUNDS
Roy Gladwin Collinson, Yardley, Birmingham, and Thomas Tyssul Jones, Newport, England, assignors to Bakelite Limited, London, England, a British company
No Drawing. Filed Feb. 1, 1957, Ser. No. 637,627
10 Claims. (Cl. 260—87.1)

This invention is for improvements in or relating to a process for the polymerization of unsaturated compounds containing one or more ethylenic double bonds and relates particularly though not exclusively to the bulk polymerization of a vinyl compound or the copolymerization of mixtures of vinyl compounds.

The term bulk polymerization means polymerization in the absence of a solvent or dispersing liquid for the monomer or monomers.

It is known to polymerize a vinyl compound, e.g. vinyl chloride, by a bulk polymerization method in which the polymerization of the vinyl halide monomer is initiated by agents such as benzoyl peroxide or azo-bis-(isobutyronitrile).

Some initiators are superior to others, for example in causing faster rates of reaction at relatively low temperatures. Thus, when azo-bis-(isobutyronitrile) is used as an initiator it is possible to produce vinyl chloride polymers at lower temperatures than when benzoyl peroxide is used and the polymers so produced have higher softening points and are mechanically stronger than those produced by the employment of a benzoyl peroxide initiator at higher temperatures. Sometimes the properties of the polymers either alone or with additives are affected by the particular initiator used. Thus, polymers of vinyl chloride containing dyestuffs and polymerized in the presence of azo-bis-(isobutyronitrile) have better color stability than those produced by the use of benzoyl peroxide. In the case of hitherto used initiators which are activated solely by thermal means, e.g. benzoyl peroxide, the rate of decomposition of the initiators at low temperatures is relatively low so that in order to obtain useful rates of reaction with these initiators it is necessary to use relatively large amounts, in which case a large proportion of the initiator remains unused. Faster rates of decomposition of these initiators may be attained by raising the reaction temperature but this gives rise to products having low molecular weight and highly branched molecules.

An object of this invention is to provide a process for the polymerization of compounds containing the ethylenic double bond, particularly vinyl chloride, or the copolymerization of a mixture of such compounds particularly wherein vinyl chloride constitutes the major proportion thereof.

Another object is to provide initiators for the polymerization of ethylenically unsaturated compounds which give rise to faster rates of reaction, particularly at temperatures below 25° C., than are attained by hitherto known initiators activated solely by thermal means. A further object is to provide initiators for the polymerization of ethylenically unsaturated compounds which leave behind relatively inert decomposition products which products may, if desired, be readily removed from the polymer.

It is an additional object to provide initiators for the polymerization of ethylenically unsaturated compounds which may be used with optimum efficiency in relatively small quantities compared with the initiators hitherto used.

According to the present invention there is provided a method for the polymerization of an unsaturated compound containing one or more ethylenic double bonds or the copolymerization of a mixture of different unsaturated compounds containing one or more ethylenic double bonds which method comprises polymerizing the compound or compounds in the substantial absence of oxygen in the presence of an initiator comprising a silver alkyl. The polymerization may be carried out by the bulk method.

The silver alkyls are highly unsaturable and the most satisfactory method of handling them is to prepare them in situ, e.g. by reacting lead tetraethyl with silver nitrate to form silver ethyl in the presence of the monomer. In many cases the system comprising a lead tetra-alkyl and a silver salt is not soluble in the monomer and in such instances it has been found that the rate of polymerization is greatly improved if a solvent for the lead tetra-alkyl and silver salt system is added thereto.

This invention may be employed with advantage for the copolymerization of a mixture of vinyl chloride and vinyl acetate consisting predominantly of vinyl chloride, and for the copolymerisation of a mixture of vinyl chloride and ethylene consisting predominantly of vinyl chloride.

In contrast to the thermally activated initiators hitherto used for the polymerization of ethylenically unsaturated compounds, the initiators of the present invention detectably initiate the polymerization of, e.g. vinyl chloride at temperatures as low as $-80°$ C., and it is possible to carry out the polymerization of vinyl chloride at a reasonable rate at $-40°$ C.

For most initiators it is known that low temperature polymerization of vinyl chloride produces polymers with a higher molecular weight than those produced at higher temperatures. Thus, where those properties that are concomitant with high molecular weight are desirable in the polymers, e.g. improved heat resistance and improved mechanical properties, the use of initiators which induce polymerization at low temperatures, e.g. at $-20°$ C. is preferred. At these low temperatures, the reactants may be maintained at a pressure of under one atmosphere whereas when hitherto known thermally activated initiators as hereinbefore described are used, in order to obtain comparable rates of polymerization it is necessary to carry out the reaction at 45° C. or thereabouts at which temperature the reactants have to be maintained under a pressure of about 7 atmospheres. As the reaction temperature increases, e.g. from $-20°$ to $0°$ C. the rate of reaction increases and the new initiators of the present invention permit of a greater output rate even when used in much lower concentrations than the hitherto used thermally activated initiators as hereinabove described.

Although the initiators of the present invention have been found to be most readily utilized in the bulk polymerization of ethylenically unsaturated monomers, it is possible to utilize them in solution, suspension and emulsion systems.

Following is a description by way of example of methods of carrying the invention into effect.

EXAMPLE 1

This example illustrates the activity of an initiator, i.e. silver ethyl, for the polymerization of vinyl chloride in accordance with the present invention at a temperature of $-80°$ C. The silver ethyl was formed in situ from lead tetraethyl and silver nitrate in the presence of methanol as a solvent for the latter materials.

To 0.5 g. of a 2% solution of lead tetraethyl in methanol in a tube was added, while at approximately $-193°$ C., 5 g. of vinyl chloride. The mixture was then degassed and, the temperature still being at approximately $-193°$ C., 0.5 g. of a 3.72% solution of silver nitrate in methanol was added, the tube was sealed after being re-evacuated and the temperature was raised to about −50° C. when the content of the tube darkened and the mixture was then immediately cooled to −80° C. After 500 hours at −80° C. there was a yield of 26.3% polymer based on the amount of monomer present initially, i.e. a percentage yield per minute of reaction time of 0.00090.

EXAMPLE 2

This example illustrates the increased activity of silver ethyl as an initiator for the polymerization of vinyl chloride at a temperature of −20° C. compared with its activity at −80° C.

To 0.5 g. of a 2% solution of lead tetraethyl in methanol in a tube was added, while at approximately −193° C., 5 g. of vinyl chloride. The mixture was then degassed and, the temperature still being at approximately −193° C., 0.5 g. of a 3.72% solution of silver nitrate in methanol was added, the tube was sealed after being re-evacuated and the temperature was raised to −20° C. The contents of the tube darkened and after an induction period of 4 minutes at this temperature a precipitate of polymer was observed and after reacting for a further 2½ hours the total yield was 17.9% based on the initial monomer content, i.e. a percentage yield per minute of reaction time of 0.123.

EXAMPLE 3

A further reaction was carried out utilizing a mixture of vinyl chloride, lead tetraethyl, silver nitrate and methanol, as in Example 2, but raising the reaction temperature to 0° C. The rate of polymerization of the vinyl chloride was further increased over that at −20° C. There was no apparent induction period at 0° C. and after 25 minutes the total yield of polymer was 7.89% based in the initial monomer content, i.e. a percentage yield per minute of reaction time of 0.315.

The much lower efficiency of benzoyl peroxide as an initiator for the polymerization reaction of vinyl chloride at 0° C. compared with silver ethyl was illustrated in an experiment in which the silver ethyl formed in situ was replaced by benzoyl peroxide in the molar concentration, based on the amount of vinyl chloride present, of 0.65% compared with 0.034% molar concentration of silver ethyl. After an induction period of about 3 hours and a reaction time of 300 hours the total yield of polyvinyl chloride was 20.9%, i.e. a percentage yield per minute of reaction time of 0.00121 compared with 0.315% for the reaction carried out in the presence of silver ethyl.

EXAMPLE 4

This example illustrates that the efficiency of the new initiators as exemplified in Example 3 by silver ethyl is not greatly improved on raising the temperature of the reaction mixture to 25° C., i.e. it illustrates the fact that the initiators of this invention are outstandingly superior to known thermally activated initiator systems as hereinbefore disclosed at temperatures below 25° C., whereas at temperatures above this their superiority although still evident becomes less marked. Utilizing the mixture as in Example 3, the temperature of the reaction mixture was maintained at 25° C., the induction period was negligible and after 25 minutes the total percentage yield of polymer based on the initial monomer content was 9.17 and the percentage yield per minute of reaction time was 0.367 compared with 0.315 when the reaction was carried out at 0° C.

Higher temperatures were required in the case of, e.g. benzoyl peroxide before this initiator became reasonably effective than in the case of the initiators of the present invention. With the same constituents and the same proportions as given for the comparative experiment based on benzoyl peroxide in Example 3, the reaction was carried out at 25° C., and after an induction period of 4 minutes and a reaction time of 48 hours the total percentage yield of polymer based on the initial monomer content was 54.2 and the percentage yield per minute of reaction time 0.0189.

Repeating this experiment with benzoyl peroxide at 45° C., after an induction period of 1 minute and a reaction time of 315 minutes the total percentage yield was 32.6 and the percentage yield per minute of reaction time was 0.104 compared with 0.0189% at 25° C. and 0.00121% at 0° C.

Even one of the more efficient thermally activated initiators hitherto known for the polymerization of vinyl chloride at 25° C., i.e. azo-bis-(isobutyronitrile) was not as efficient as silver ethyl as an initiator for the polymerization of vinyl chloride. With a molar concentration of 0.643% of azo-bis-(isobutyronitrile) present in vinyl chloride at 25° C., there was an induction period of 4 minutes and after eleven hours the total percentage yield was 27.8, i.e. a percentage yield per minute of reaction time of 0.042 compared with a 9.2% total yield in 25 minutes, i.e. 0.367% yield per minute of reaction time in the presence of a much lower concentration of silver ethyl at 25° C., formed in situ from lead tetraethyl and silver nitrate and in the presence of methanol.

In experiments carried out respectively in the presence of and in the absence of methanol it was found that in the case of vinyl chloride there was a large decrease in the percentage yield per minute of reaction time in the absence of the solvent as shown by the following two examples.

EXAMPLE 5

A mixture, degassed and sealed in a tube, consisting of 5 g. vinyl chloride, 1 g. of methanol, 0.01 g. of lead tetraethyl and 0.0186 g. of silver nitrate was heated for 25 minutes at 25° C. The yield of polymer was 0.367% per minute of reaction time.

EXAMPLE 6

Repeating the reaction of Example 5 at 20° C. in the absence of the methanol, the yield was about one tenth of that recorded in Example 5 and was 0.0365% per minute of reaction time.

EXAMPLE 7

15% of the vinyl chloride monomer in Example 2 was replaced by vinyl acetate monomer and the copolymerization was carried out at −20° C. After an induction period of 15 to 30 minutes at this temperature the reaction proceeded and after 2½ hours the total percentage yield of polymer based on the initial monomer content was 9.2, i.e. a percentage yield per minute of reaction time of 0.061. It can be seen that the replacement of part of the vinyl chloride by vinyl acetate reduced the rate of reaction. Nevertheless it was much faster than the rate of reaction obtained in the polymerization of vinyl chloride in the presence of benzoyl peroxide at 25° C. as shown in the comparative experiment in Example 4 wherein the percentage yield per minute of reaction time was 0.0189.

EXAMPLE 8

This example illustrates the polymerization of methyl methacrylate at −20° C. To 0.5 g. of a 2% solution of lead tetraethyl in methanol was added, while at approximately −193° C., 5 g. of methyl methacrylate. The mixture was then degassed and, the temperature still being approximately −193° C. 0.5 g. of a 3.72% solution of silver nitrate in methanol was added, the tube was sealed after being re-evacuated and the temperature was raised to −20° C. After 2¾ hours the total yield was 4.25% based on the initial monomer content, i.e. a percentage yield per minute of reaction time of 0.0261.

EXAMPLE 9

This example illustrates the polymerization of vinyl acetate at −20° C. To 0.5 g. of a 2% solution of lead tetraethyl in methanol was added, while at approximately −193° C., 4.4 g. of vinyl acetate. The mixture was then degassed and, the temperature still being approximately —193° C., 0.5 g. of a 3.72% solution of silver nitrate in methanol was added, the tube was sealed after being re-evacuated and the temperature was raised to —20° C. After 2½ hours the total yield based on the monomer present initially was 11.4%, i.e. a percentage yield per minute of reaction time of 0.076.

EXAMPLE 10

This example illustrates the polymerization of acrylonitrile at +20° C. To 0.0192 g. of silver nitrate were added 5 g. of acrylonitrile; the mixture was degassed and, the temperature being approximately —193° C., 0.01 g. of lead tetraethyl was added, the tube was sealed after being re-evacuated and the temperature was raised to +20° C. After 2 hours 40 minutes the total yield based on the monomer initially present was 4.05% and the percentage yield per minute of reaction time was 0.0253.

EXAMPLE 11

This example relates to the use of silver ethyl as an initiator for the suspension polymerization of vinyl chloride. To a degassed mixture consisting of 15 g. of water, 5 g. methyl alcohol, 0.13 g. of polyvinyl alcohol and 0.992 g. of silver nitrate, was added 5 g. of vinyl chloride, the temperature being approximately —193° C. then, at the same temperature, 0.08 g. of lead tetraethyl was added and before sealing the tube was re-evacuated. After shaking the mixture for 6 hours at 5° C., 83% of the vinyl chloride was converted to a polymer.

It will be noticed that in order to make the reaction proceed at a reasonable rate an excess of silver nitrate was added. A non-ionic suspending agent was used, namely, polyvinyl alcohol in order that the silver nitrate would not be precipitated.

EXAMPLE 12

Using a mixture as given in Example 11, it was found that after 7½ hours at —15° C., 41% of the vinyl chloride was converted into the polymer.

EXAMPLE 13

This example illustrates the activity of an initiator of this invention when used in the polymerization of ethylene.

To 2.67 g. of a 3.72% solution of silver nitrate in methanol which had been previously degassed was added 6.18 g. of ethylene at —193° C. 0.213 g. of lead tetraethyl was added to the mixture at —193° C., and the reaction tube was re-evacuated before sealing. After 23½ hours at 10° C., 15.93% of the ethylene was converted to a solid polymer.

EXAMPLE 14

This example illustrates the copolymerization of ethylene and vinyl chloride in the presence of an initiator of this invention.

To 1 g. of a 3.72% solution of silver nitrate in methanol which had been previously degassed was added 2.57 g. of vinyl chloride and 1.15 g. of ethylene at —193° C. 0.08 g. of lead tetraethyl was added to the mixture while still at —193° C., and the tube was re-evacuated before sealing. After 23 hours at —20° C., 0.73 g. of a solid copolymer of vinyl chloride and ethylene was obtained.

EXAMPLE 15

To 2 g. of a 3.72% solution of silver nitrate in methanol which had been previously degassed was added 3.53 g. of ethylene, and 2.65 g. of vinyl chloride at —193° C. 0.16 g. of lead tetraethyl was then added to the mixture while still at —193° C., and the tube was re-evacuated before sealing. After 24 hours at 0° C., 0.82 g. of a solid copolymer of vinyl chloride and ethylene was obtained.

EXAMPLE 16

This example illustrates the copolymerization of propylene and vinyl chloride in the presence of an initiator of this invention.

To 1 g. of a 3.72% solution of silver nitrate in methanol which had been previously degassed was added 1.75 g. of propylene, and 2.57 g. of vinyl chloride at —193° C. 0.08 g. of lead tetraethyl was then added to the mixture while still at —193° C., and the tube was re-evacuated before sealing. After 19 hours at —25° C., 0.24 g. of a solid copolymer of vinyl chloride and propylene was obtained.

The following three examples relate to the solution polymerization of vinyl chloride.

EXAMPLE 17

To a degassed mixture of 2.0 g. of a 3.72% solution of silver nitrate in methanol, 20.0 g. of xylene and 5 g. of vinyl chloride, was added 0.16 g. of lead tetraethyl, the temperature being at —193° C. or thereabouts. The reaction tube was then re-evacuated and sealed. After 7½ hours at —20° C. it was found that 10.6% of the monomer had been converted to polymer.

EXAMPLE 18

To a degassed mixture of 2.0 g. of a 3.72% solution of silver nitrate in methanol, 20.0 g. of cyclohexanone and 5 g. of vinyl chloride, was added 0.16 g. of lead tetraethyl, the temperature being —193° C. or thereabouts. The reaction tube was then re-evacuated and sealed. After 7½ hours at —20° C., it was found that 15.5% of the monomer had been converted to polymer.

EXAMPLE 19

To a degassed mixture of 2.0 g. of a 3.72% solution of silver nitrate in methanol, 20.0 g. of acetone and 5.0 g. of vinyl chloride, was added 0.16 g. of lead tetraethyl, the temperature being —193° C. or thereabouts. The reaction tube was then re-evacuated and sealed. After 7½ hours at —20° C. it was found that 9.2% of monomer had been converted to polymer.

EXAMPLE 20

This example relates to the emulsion polymerization of vinyl chloride.

To a degassed mixture of 15 g. of water, 5 g. of methanol, 1 g. of polyethylene glycol mono-oleate, 0.05 g. of polyvinyl alcohol, 0.0312 g. of disodium salt of methylene di-naphthalene sulphonic acid and 0.0744 g. of silver nitrate, was added 3.8 g. of vinyl chloride while maintaining the mixture at —193° C.; at the same temperature 0.08 g. of lead tetraethyl was added and then the tube was re-evacuated and sealed. After 300 minutes at 50° C., 50% of monomer was converted to polymer.

EXAMPLE 21

This example illustrates the activity of silver ethyl as an initiator for the polymerization of vinyl chloride at —40° C.

To a solution of 2.2 g. of silver nitrate in 59 g. of methyl alcohol at —80° C. was added 472 g. of vinyl chloride monomer. The mixture was then cooled to —193° C. and de-gassed after which 4.7 g. of lead tetraethyl were added and the reaction tube was then sealed. The temperature of the reaction mixture was raised to —40° C., the contents of the tube darkened and after an induction period of 10 minutes a precipitate of polymer was observed. After reacting for a further 6 hours the total yield of polymer was 35% based on the initial monomer content i.e. a percentage yield per minute of reaction time of 0.098.

Polyethylene prepared by the polymerization of ethylene in the presence of a silver alkyl as polymerization catalyst is highly crystalline. Its X-ray diffraction pattern resembles that of polymethylene prepared from diazomethane and of polyethylenes prepared by the Ziegler catalyst system or that sold under the trademark "Marlex." Typically the polyethylene of Example 13 has a weight fraction crystalline content of 73% as determined from Geiger counting of the X-ray diffraction pattern of the polymer. By the same method "Marlex" polyethylene has a weight fraction crystalline content of 79% and a conventional low density polyethylene such as "DYNH" polyethylene has a weight fraction crystalline content of 50%. Homopolymers of vinyl chloride prepared by the polymerization of vinyl chloride in the presence of a silver alkyl catalyst as herein described are also more highly crystalline than previously known vinyl chloride homopolymers. Modulus-temperature behaviour of polyvinyl chloride made in the presence of a silver alkyl indicates that increasing crystallinity is obtained the lower the polymerization temperature. The increased crystallinity with lower polymerization temperatures is further corroborated by the sharper and stronger X-ray diffraction patterns. In the Table 1 which follows there are shown tensile modulus values of the polyvinyl chloride polymers of Examples 2 and 21 in comparison with a conventional commercial polyvinyl chloride "QYSQ" which is a representative commercial vinyl chloride polymer marketed by the Bakelite Company and is typical of the hitherto known polyvinyl chloride resin having a low order of crystallinity. The higher order of crystallinity of the vinyl chloride homopolymers polymerised in the presence of a silver alkyl catalyst is fully evident from the modulus-temperature behaviour as shown in Table 1. This higher order of crystallinity is directly reflected in the improved dimensional stability of the polymer at high temperatures. Thus, the vinyl chloride polymer prepared as hereinbefore described can be fabricated into film, piping, wire insulation, and other articles which can be exposed to higher service temperatures than possible with previously known vinyl chloride polymers.

TABLE 1

*Tensile Modulus of Polymers of Vinyl Chloride at Various Temperatures*

| Temperature, ° C. | Bakelite "QYSQ" vinyl chloride polymer, p.s.i. | Vinyl chloride polymer of Example 2, p.s.i. | Vinyl chloride polymer of Example 21, p.s.i. |
| --- | --- | --- | --- |
| 25 | 300,000 | 300,000 | 300,000 |
| 60 | 250,000 | 250,000 | 250,000 |
| 100 | 1,500 | 5,000 | 50,000 |
| 120 | 1,000 | 2,000 | 7,000 |
| 180 | 400 | 600 | 2,500 |
| 200 | ¹ melts | 400 | 2,090 |
| 225 | ¹ melts | ¹ melts | 1,700 |

¹ For this purpose "melts" is defined as the temperature at which the modulus has decreased to 100 p.s.i.

We claim:
1. The method for polymerizing mono-ethylenically unsaturated monomers which comprises contacting at least one such monomer in the substantial absence of oxygen at a temperature of from about −80° C. to about +25° C. with a catalytic amount of a polymerization initiator consisting essentially of silver ethyl.

2. The method for copolymerizing a mixture of at least two mono-ethylenically unsaturated monomers which comprises contacting said mixture in the substantial absence of oxygen at a temperature of from about −80° C. to about +25° C. with a catalytic amount of a polymerization initiator consisting essentially of silver ethyl.

3. The method according to claim 1 wherein the polymerization reaction is carried out at a temperature of from −40° C. to about 25° C.

4. The method according to claim 3 wherein the monoethylenically unsaturated monomer is vinyl chloride.

5. The method according to claim 3 wherein the monoethylenically unsaturated monomer is vinyl acetate.

6. The method according to claim 3 wherein the monoethylenically unsaturated monomer is acrylonitrile.

7. The method according to claim 3 wherein the monoethylenically unsaturated monomer is methyl methacrylate.

8. The method according to claim 3 wherein the monoethylenically unsaturated monomer is ethylene.

9. The method according to claim 3 wherein the silver ethyl is produced in situ in contact with the monoethylenically unsaturated monomer by reacting tetraethyl lead with silver nitrate.

10. A vinyl chloride homopolymer prepared by contacting vinyl chloride in the substantial absence of oxygen and at a temperature of about −40° C. with a catalytic amount of silver ethyl prepared by the in situ reaction of silver nitrate and lead tetraethyl, said vinyl chloride homopolymer being further characterized by having a tensile modulus of 50,000 pounds per square inch at 100° C. and a tensile modulus of 2,000 pounds per square inch at 200° C.

References Cited in the file of this patent

UNITED STATES PATENTS

| | | |
| --- | --- | --- |
| 1,775,882 | Young et al. | Sept. 16, 1930 |
| 2,762,791 | Pease et al. | Sept. 11, 1956 |
| 2,781,410 | Ziegler et al. | Feb. 12, 1957 |
| 2,888,448 | Gresham et al. | May 26, 1959 |

FOREIGN PATENTS

| | | |
| --- | --- | --- |
| 767,417 | Great Britain | Feb. 6, 1957 |
| 651,579 | Great Britain | Apr. 4, 1951 |
| 533,362 | Belgium | May 16, 1955 |

OTHER REFERENCES

Bawn et al.: Faraday Society Discussions (1947), No. 2, pages 228–236, pages 229 and 235 only, needed.

Krcyil: Kurzes Handbuch der Polymerisationstechnick, Band I, Einstoffpolymerisation, Leipzig, 1940, pages 367 and 399.

Schildknecht: Vinyl and Related Polymers, Wiley, New York, 1952, page 429.